(12) United States Patent
Nass et al.

(10) Patent No.: US 8,395,290 B2
(45) Date of Patent: Mar. 12, 2013

(54) CONNECTING DEVICE FOR ELECTRICALLY CONNECTING A THREE-PHASE MOTOR

(75) Inventors: Andreas Nass, Warmsen (DE); Albert Ferderer, Espelkamp (DE)

(73) Assignee: Harting Electric GmbH & Co. KG (DE)

( * ) Notice: Subject to any disclaimer, the term of this patent is extended or adjusted under 35 U.S.C. 154(b) by 493 days.

(21) Appl. No.: 12/731,012

(22) Filed: Mar. 24, 2010

(65) Prior Publication Data
US 2010/0244598 A1 Sep. 30, 2010

(30) Foreign Application Priority Data

Mar. 31, 2009 (DE) .................. 10 2009 015 705

(51) Int. Cl.
*H02K 11/00* (2006.01)
(52) U.S. Cl. ......................... 310/71; 439/221
(58) Field of Classification Search .............. 310/71; 439/221, 638
See application file for complete search history.

(56) References Cited

U.S. PATENT DOCUMENTS

| 3,525,971 A | 8/1970 | Glassman | 339/14 |
| 4,258,969 A * | 3/1981 | Stallard | 439/53 |
| 4,748,355 A * | 5/1988 | Anderson et al. | 310/71 |
| 5,017,818 A * | 5/1991 | Dohogne | 310/71 |
| 2004/0253876 A1* | 12/2004 | Kim | 439/651 |

FOREIGN PATENT DOCUMENTS

| DE | 30 43 538 | 5/1981 |
| DE | 20 2006 016 472 | 2/2007 |
| EP | 2 086 066 | 8/2009 |
| FR | 2 617 651 | 7/1987 |

OTHER PUBLICATIONS

European Search Report, dated Jul. 22, 2010 (7 pgs).
Japanese Office Action issued for corresponding application No. 2010-081109, dated Apr. 26, 2012 (4 pgs).
Chinese Office Action issued for 201010157967.2 (with English translation), dated Aug. 23, 2012 (14 pgs).

* cited by examiner

*Primary Examiner* — Tran Nguyen
*Assistant Examiner* — Naishadh Desai
(74) *Attorney, Agent, or Firm* — Hayes Soloway P.C.

(57) ABSTRACT

A connecting device for electrically connecting a three-phase motor having three windings (U, V, W) to a three-phase network. The connecting device comprises a mains connection unit (18; 68) for connecting the phase lines (L1, L2, L3) of the three-phase network, and a motor connection unit (14; 110) for connecting the six winding ends (U1, U2, V1, V2, W1, W2) of the three-phase motor. An exchangeable coupling module (16; 70, 72; 70, 72') is furthermore provided, which is arranged between the mains connection unit and the motor connection unit and contains contacts and wiring elements electrically connecting the six winding ends (U1, U2, V1, V2, W1, W2) in a predefined manner to the three phase lines (L1, L2, L3) of the three-phase network.

13 Claims, 5 Drawing Sheets

CONNECTING DEVICE FOR ELECTRICALLY CONNECTING A THREE-PHASE MOTOR

BACKGROUND OF THE INVENTION

The invention relates to a connecting device for electrically connecting a three-phase motor.

Three-phase motors having at least three windings and being adapted to be connected to a three-phase network which comprises three electrical phase lines having phase-shifted alternating voltages are known. Such three-phase motors are used in a star connection or in a delta connection depending on the application. Depending on the selected connection, the ends of the windings of the three-phase motor have to be connected in different manners known per se to the phase lines of the three-phase network. The way of connecting the windings to the phase lines also determines the direction of rotation of the motor.

In the prior art, the wiring is realized manually in situ in a so-called motor connection box into which the motor winding terminals and the phase lines are guided. This wiring is very time-consuming and in case of a change of the connection or of the direction of rotation of the motor, it requires a re-plugging of the corresponding terminals, which leads frequently to errors. Tests in which plug connectors are used for the coupling are also known. Here, the motor connection box is partially dispensed with. A change of the connection and of the direction of rotation however always requires a rewiring.

Document EP 2 086 066 discloses as a post-published document a connecting device for electrically connecting a multiphase electric motor to a power source, which is made up of a connection box and a substantially cylindrical adapter.

Document DE 20 2006 016 472 U1 discloses a connector plug unit for three-phase motor units having a bridge circuit module within the connector housing. A bridge circuit is realized in the bridge circuit module, which is required for driving the three-phase motor unit by means of a delta connection.

Documents U.S. Pat. No. 3,525,971, FR 2617651 and DE 30 43 538 A1 each disclose plug connectors which can cause a reversal of the direction of rotation of a motor connected to a three-phase network by a rotated mounting or by interposing an adapter.

An object of the invention is to make the motor connection box, also known as motor terminal box, unnecessary. It is also an object of the invention to permit the electrical connection on the cable side using a connecting device by means of which both the direction of rotation of the motor and the type of the connection used can be selected in situ without a manual re-plugging/rewiring of the motor winding ends being necessary in case of a change of the connection or of the direction of rotation of the motor.

SUMMARY OF THE INVENTION

The invention provides a connecting device for electrically connecting a three-phase motor having at least three windings to a three-phase network, which comprises a mains connection unit for connecting the phase lines of the three-phase network, and a motor connection unit for connecting the at least six winding ends of the three-phase motor. An exchangeable coupling module is arranged between the mains connection unit and the motor connection unit and contains contacts and wiring elements electrically connecting the six winding ends in a predefined manner to the three phase lines of the three-phase network. A motor connection box in which re-plugging works are to be performed in order to change the connection is therefore no longer necessary. The desired connecting is realized in situ by means of the exchangeable coupling module without conductors having to be contacted with high expenditure.

In one embodiment of the invention, a first coupling module is provided which connects the three windings of the three-phase motor in a delta connection, and a second coupling module is provided, which connects the three windings in a star connection. In order to switch from a delta connection to a star connection, it is therefore not necessary to detach the terminals of the winding ends on the motor side of the motor connection unit, and the phase terminals on the mains connection unit also remain unaffected. It is merely necessary to exchange the coupling module.

The coupling module, or each of the coupling modules, is adapted to be mounted so as to be rotated through 180° along a coupling direction, i.e. along an axis leading from the mains connection unit to the motor connection unit. Due to this rotation of the coupling module, the direction of rotation of the motor is reversed. The terminals on the mains connection unit and on the motor connection unit thus remain unaffected also in case of a change of the direction of rotation.

Preferably, the mains connection unit has one terminal for each of the three phase lines, the terminal branching in two parallel phase contacts in the direction to the coupling module, the coupling module or each of the coupling modules each electrically contacting only one of the parallel phase contacts.

In a preferred embodiment, the motor connection unit has on the side facing the coupling module winding contacts to the six winding ends which are arranged in two groups of three winding contacts each, which are point symmetric to each other. This can involve an arrangement on two parallel straight lines, or the winding ends can also be arranged in a respective semicircle, the two semicircles being arranged so as to form a circle, for example.

In the first group, the winding beginning of a first winding, the winding end of a third winding, and the winding beginning of the third winding are arranged side by side, and in the second group, the winding end of the first winding is point symmetric to the winding beginning of the first winding, the winding beginning of the second winding is point symmetric to the winding end of the third winding, and the winding end of the second winding is point symmetric to the winding beginning of the third winding. It is therefore ensured that in case of a rotation of the coupling module through 180°, the direction of rotation of the motor is changed since other winding beginnings or winding ends thus contact the phase lines.

In another embodiment of the invention, the coupling module comprises an exchangeable bridge module which contains the wiring elements. A first bridge module is provided which contains wiring elements such that the three windings of the motor are connected in a delta connection. A second bridge module is further provided which contains wiring elements such that the three motor windings are connected in a star connection. In this embodiment, only part of the coupling module has to be exchanged in order to change the connection. It is however of course also possible to exchange the entire coupling module which is provided with the first bridge module, for example, for a different coupling module which is provided with the second bridge module.

The mains connection unit can be mounted to the coupling module in two positions that are rotated through 180° with respect to each other in order to connect the phase lines of the three-phase network. Due to the rotation of the mains connection unit, a change of the direction of rotation of the motor can be produced.

The connecting device is configured in a parallelepipedal manner for both embodiments.

The phase lines of the three-phase network are preferably firmly connected to the mains connection unit. This is preferably realized by means of clamping spring connections.

The connecting device is furthermore configured such that the six winding ends on the motor connection unit are adapted to be firmly connected, preferably as a crimp connection.

BRIEF DESCRIPTION OF THE DRAWINGS

The invention is described below with reference to two preferred embodiments illustrated in the enclosed drawings in which.

DETAILED DESCRIPTION OF THE DRAWINGS

First Example Embodiment

Figure 1:
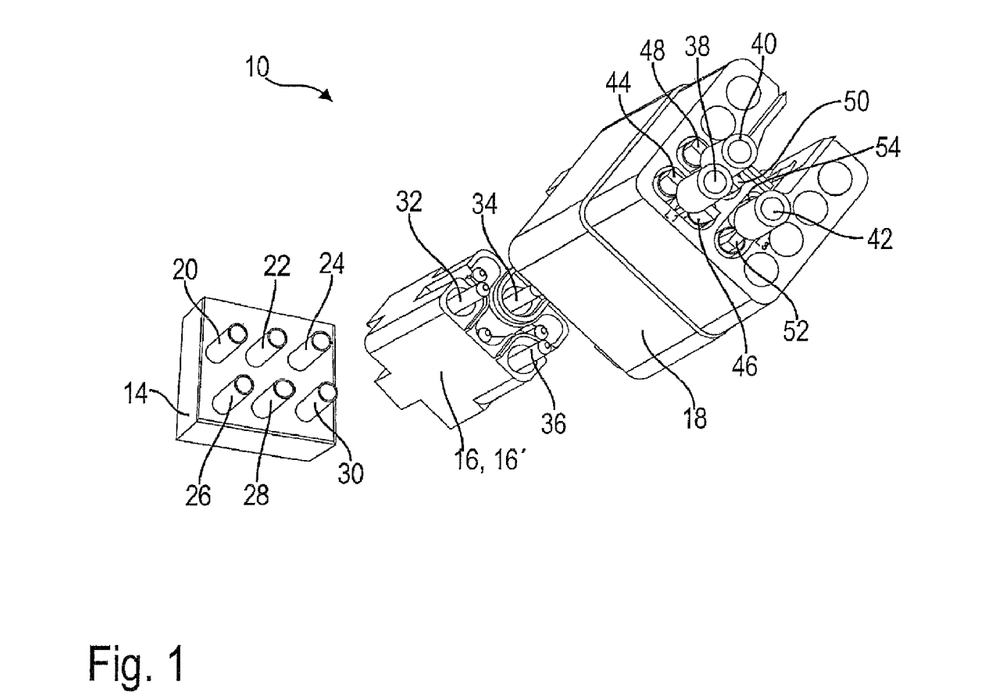
FIG. 1 shows in a schematized three-dimensional representation a motor connection unit, a coupling module and a mains connection unit according to a first embodiment of the invention.

FIG. 1 shows a connecting device 10 of a first example embodiment in a schematized form. The connecting device 10 comprises a motor connection unit 14, an exchangeable coupling module 16, 16' and a mains connection unit 18 which are connected to each other by means of plug-in connections.

On its side facing the coupling module 16, 16', the motor connection unit 14 has six winding contacts 20, 22, 24, 26, 28 and 30. The other side of the motor connection unit 14 that is not visible is provided with terminals which are electrically connected to the winding contacts 20, 22, 24, 26, 28 and 30 and to which the winding ends of a three-phase motor can be coupled, preferably via a crimp connection. The motor windings of a three-phase motor are usually designated by U, V and W, each motor winding having two ends. The six winding contacts 20, 22, 24, 26, 28 and 30 are therefore connected to the motor winding ends U1, U2, V1, V2, W1 and W2. The six winding contacts are arranged in two groups each having three contacts.

To explain the connecting device according to the invention, reference is made by way of example to a three-phase motor having three windings. The connecting device can of course also be used in multipolar machines in which two windings respectively belong to one phase.

On its side facing the motor connection unit 14, the coupling module 16, 16' has six winding connecting contacts which are suitable for electrically contacting the winding contacts 20, 22, 24, 26, 28 and 30. Here, the winding connecting contacts on the coupling module and the winding contacts on the motor connection unit are arranged in two groups such that an electrical contact is permitted in two positions rotated through 180° with respect to each other, i.e. the arrangement of the contacts must be point symmetric to an axis of rotation extending from the side facing the motor connection unit 14 to the side of the coupling module 16, 16' facing the mains connection unit 18 and about which the coupling module can be rotated. The winding connecting contacts are not visible in FIG. 1. On the side facing the mains connection unit 18, the coupling module has three phase connecting contacts 32, 34, 36. The phase connecting contacts 32, 34, 36 serve to contact the phase lines L1, L2 and L3 of a three-phase network via the mains connection unit 18. Within the coupling module 16, 16', the phase connecting contacts are electrically connected to the winding connecting contacts arranged opposite thereto. Here, the two outer winding connecting contacts of one of the groups of winding connecting contacts are connected to the phase connecting contacts 32 and 36, and the centre winding connecting contact of the other group is connected to the phase connecting contact 34. The other winding connecting contacts end as blind contacts to the outside on the side facing the mains connection unit 18. The outer contacts of the coupling modules 16 and 16' do not differ from each other. The coupling modules only differ from each other in their inner wiring elements which realize a delta or a star connection. To easily distinguish the various coupling modules from each other, they can be configured in different colors so that a simple optical distinction is possible.

On its side facing away from the coupling module 16, 16', the mains connection unit 18 has three terminals 38, 40, 42 for connecting the phase lines L1, L2, L3 of the three-phase network. The terminals 38, 40, 42 are preferably configured as clamping spring connection terminals to which the phase lines can be coupled in a rapid and reliable manner.

As shown in FIG. 1, the terminals 38, 40, 42 each branch in two parallel terminals which are guided to the side of the mains connection unit 18 facing the coupling module 16, 16' and end there as phase contacts 44, 46, 48, 50, 52 and 54. In the present example, terminal 38 is provided for a connection of phase line L1 and branches in phase contacts 44 and 46.

Terminal 40 is provided for a connection of phase line L2 and branches in phase contacts 48 and 50. Terminal 42 is provided for a connection of phase line L3 and branches in phase contacts 52 and 54. On its side facing the coupling module 16, 16', the mains connection unit 18 thus has six phase contacts 44, 46, 48, 50, 52 and 54, two parallel terminals being respectively connected to each other within the mains connection unit 18 and contacting the same phase of the three-phase network.

The phase connecting contacts 32, 34, 36 of the coupling module 16, 16' and the phase contacts 44, 46, 48, 50, 52 and 54 of the mains connection unit 18 are configured such that one of the phase contacts that are electrically connected in parallel is respectively contacted by the phase connecting contacts 32, 34, 36 of the coupling module 16, 16', and the respective other phase contact of the phase contacts that are electrically connected in parallel is contacted upon rotation of the coupling module through 180° about a longitudinal axis.

Figure 2:
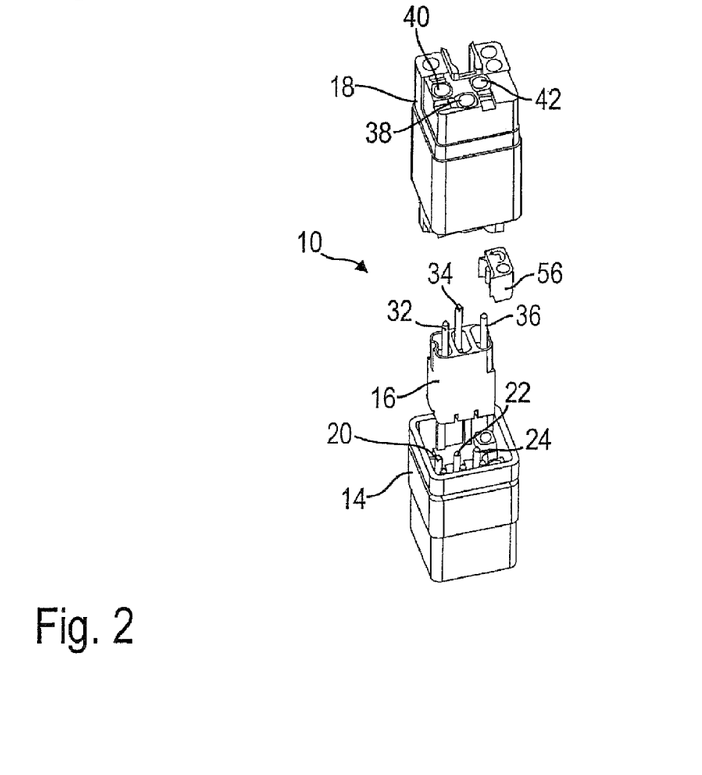
FIG. 2 shows in a schematized three-dimensional representation a connecting device in accordance with FIG. 1 from a different viewing direction.

FIG. 2 shows the connecting device 10 from a slightly different perspective. Here, the motor connection unit 14 which is represented in a strongly schematized manner in FIG. 1, is shown in more detail. Three of the winding contacts 20, 22, 24 can be seen in FIG. 2, which are adapted to be electrically connected to the winding ends of the three-phase motor in the motor connection unit 14 on the side facing the coupling module. The coupling module 16, 16' is inserted into the motor connection unit 14. A coding piece 56 can be arranged in the motor connection unit 14 next to the coupling module 16, 16' to thus avoid an undesired rotation of the coupling module during insertion. As will be explained below, the coupling module 16, 16' can be mounted in two positions rotated through 180° with respect to each other to thus reverse the direction of rotation of the motor.

The mains connection unit 18 comprises the terminals 38, 40, 42 like in FIG. 1. On the side facing away from the coupling module, the mains connection unit 18 further has additional schematically outlined terminals. They serve, for example, to apply ground, the protective earth, to realize a motor braking function, and/or the neutral conductor, and are also further guided to the motor connection side. They are however not relevant to the function of the connecting device according to the invention and are therefore not discussed in further detail.

Figure 3:
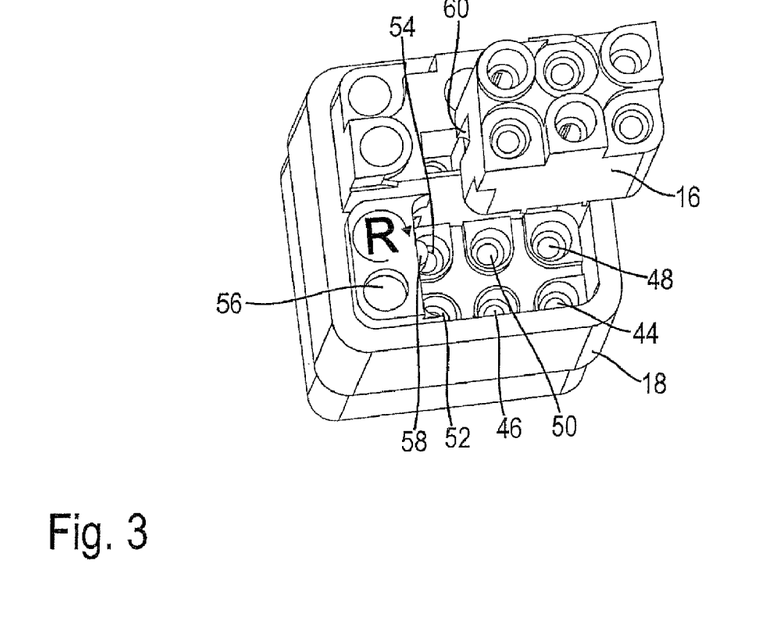
FIG. 3 shows a schematized three-dimensional representation of a coupling module and of a mains connection unit.

FIG. 3 shows the mains connection unit 18 as viewed from the coupling module side, with the six phase contacts 44, 46, 48, 50, 52 and 54. A coding piece 56 is inserted. It is marked with an "R" for right-hand rotation, and an arrow additionally indicates the direction of rotation of the motor. The coupling module 16, 16' can only be inserted in one fitting position when the coding piece 56 is inserted, as a nose 58 on the coding piece 56 cooperates with a recess 60 on the coupling module 16, 16'. It is of course also possible to use other coding possibilities known to a person skilled in the art.

On the coupling module 16, 16', the winding connecting contacts are visible which can electrically contact the winding contacts 20, 22, 24, 26, 28 and 30 of the motor connection unit 14.

Depending on the application, three-phase motors are operated in a so-called delta connection or a star connection. Invisible wiring elements in the coupling module 16, 16' ensure the desired connection between the motor winding ends and the phase lines.

Figure 4A:
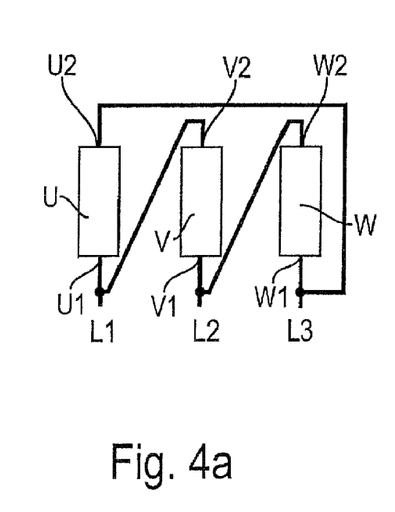
FIG. 4a shows an electrical circuit diagram for connecting the three motor windings to the three phase lines in a first direction of rotation in a delta connection.

FIG. 4*a* shows the electrical circuit diagram for a delta connection. The ends of the three windings U, V and W of the three-phase motor are connected in a triangular shape, that means that the winding end U2 of the motor winding U is connected to the winding beginning W1 of the motor winding W, the winding end W2 of the motor winding W is connected to the winding beginning V1 of the motor winding V, and the winding end V2 of the motor winding V is connected to the winding beginning U1 of the motor winding U. The phase lines are connected to the respective winding beginnings, which means that the phase line L1 is connected to the winding beginning U1, the phase line L2 is connected to the winding beginning V1, and the phase line L3 is connected to the winding beginning W1.

Figure 4B:
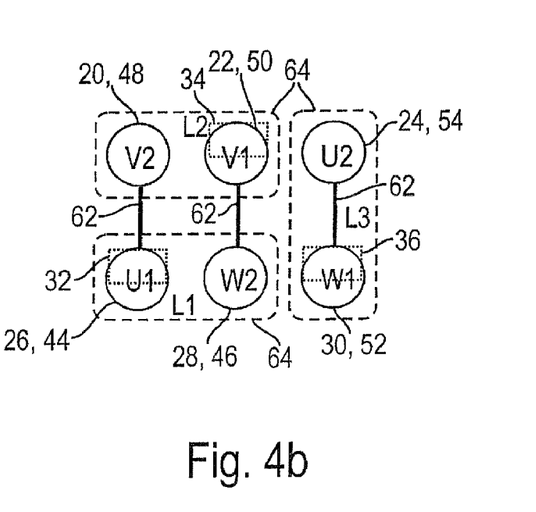
FIG. 4b shows a schematized representation for realizing the connection shown in FIG. 4a using the connecting device according to FIGS. 1 to 3.

FIG. 4*b* shows in a schematic top view the phase contacts 44, 46, 48, 50, 52 and 54 of the mains connection unit 18 as circles, dotted lines 64 respectively enclosing the two phase contacts which are electrically arranged in parallel and contact the same phase line. The winding contacts 20, 22, 24, 26, 28 and 30 of the motor connection unit 14 are arranged so as to coincide with the phase contacts of the mains connection unit 18. For a better comprehension, the phase lines L1, L2 and L3 associated with the phase contacts are directly inserted in FIG. 4*b* just as the winding ends U1, U2, V1, V2, W1 and W2 which are coupled to the winding contacts. The winding contacts 20 to 30 of the motor connection unit 14 are positioned in two groups that are point symmetric to each other, which means that three winding contacts are respectively arranged side by side, and the other three winding contacts are also arranged side by side on a straight line parallel thereto. According to FIG. 4*b*, in the first group, the winding beginning U1 of the motor winding U, the winding end W2 of the motor winding W, and the winding beginning of the motor winding W1 are arranged side by side. The winding end V2 of the winding V, next thereto the winding beginning V1 of the winding V and the winding end U2 of the winding U are arranged thereabove in a point symmetric arrangement.

In the schematic representation, a coincident representation of the phase contacts and of the winding contacts has been chosen. In the practical realization, the contacts need not be coincident since the electrical contact is realized via the coupling module arranged therebetween.

The three phase connecting contacts 32, 34, 36 of the coupling module 16 are drawn as rectangles. The fitting position shown corresponds to the fitting position shown in FIG. 1. The coupling module 16 is a coupling module for a coupling in a delta connection. Wiring elements 62 each connecting opposite contacts to each other are therefore contained in the coupling module.

The phase connecting contact 32 of the coupling module 16 establishes an electrical contact to the phase contact 44 of the mains connection unit 18, which for its part is connected to the phase line L1 of the three-phase network. The phase connecting contact 32 is electrically connected to the opposite winding connecting contact within the coupling module 16, which is connected to the winding beginning U1 via the motor connection unit. U1 is thus connected to the phase L1. U1 is further connected to V2 via a wiring element 62.

The phase connecting contact 34 of the coupling module 16 establishes an electrical contact to the phase contact 50 of the mains connection unit 18, which for its part is connected to the phase line L2 of the three-phase network. The phase connecting contact 34 is electrically connected to the opposite winding connecting contact within the coupling module 16, which is connected to the winding beginning V1 via the motor connection unit. V1 is thus connected to the phase L2. V1 is further connected to W2 via a wiring element 62.

The phase connecting contact 36 of the coupling module 16 establishes an electrical contact to the phase contact 52 of the mains connection unit 18, which for its part is connected to the phase line L3 of the three-phase network. The phase connecting contact 36 is electrically connected to the opposite winding connecting contact within the coupling module 16, which is connected to the winding beginning W1 via the motor connection unit. W1 is thus connected to the phase L3. W1 is further connected to U2 via a wiring element 62.

The contacting according to FIG. 4b thus results in a connection of the motor windings to each other and to the phases of the three-phase network according to the circuit diagram of FIG. 4a.

Figure 5A:
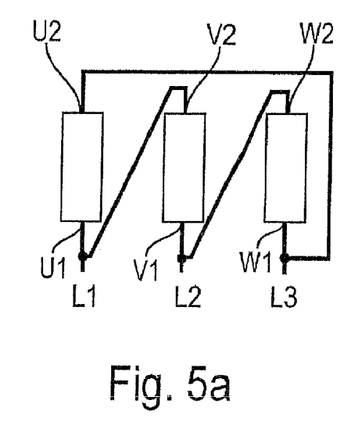
FIG. 5a shows an electrical circuit diagram for connecting the motor windings to the phase lines for a second direction of rotation in a delta connection.

FIG. 5a also shows the connection of the motor windings U, V and W for a delta connection, but with a different direction of rotation. That means that the phase lines L1 and L2 are exchanged with respect to the representation in FIG. 4a.

Figure 5B:
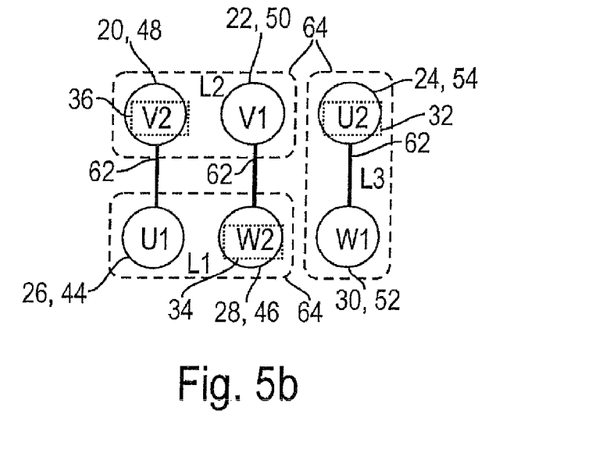
FIG. 5b shows a schematized representation for realizing the connection shown in FIG. 5a using the connecting device according to FIGS. 1 to 3.

FIG. 5b shows the corresponding association of the contacts of the motor connection unit 14, of the mains connection unit 18 and of the coupling module 16. As a delta connection is again involved, the same coupling module 16 as in the connection according to FIG. 4a is used. This means that the wiring elements 62 each connect opposite contacts. In comparison with FIG. 4b, the coupling module 16 has been mounted so as to be rotated through 180° about an axis extending between the motor connection unit 14 and the mains connection 18 along the coupling direction. Therefore, the phase connecting contact 36 of the coupling module 16 now contacts the phase line L2 via the phase contact 48, the phase connecting contact 34 of the coupling module 16 contacts the phase contact 46 connected to the phase line L1, and the phase connecting contact 32 of the coupling module contacts the phase contact 54 of the mains connection unit 18 which is connected to the phase line L3. The position of the winding contacts is unchanged, i.e. the phase L2 is connected to V2 and to U1 via a wiring element 62, the phase L1 is connected to W2 and to V1 via a wiring element 62, and the phase L3 is connected to U2 and to W1 via a wiring element 62. The direction of rotation of the motor is therefore reversed as desired. The fitting position of the coupling module desired for this direction of rotation can for its part be fixed by means of a corresponding coding piece 56.

Figure 6A:
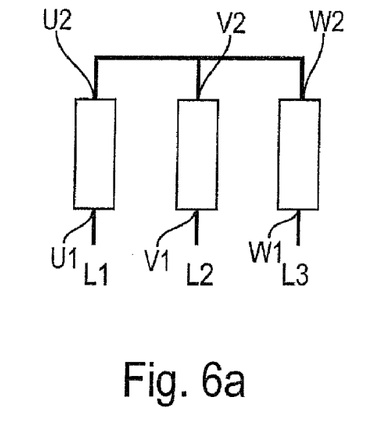
FIG. 6a shows an electrical circuit diagram for connecting the motor windings to the phase lines in a first direction of rotation in a star connection.

FIG. 6a shows the electrical circuit diagram for a star connection of the motor windings U, V and W. For this purpose, the motor winding ends U2, V2 and W2 are electrically connected, whereas the phase line L1 is connected to the winding beginning U1, the phase line L2 is connected to the winding beginning V1, and the phase line L3 is connected to the winding beginning W1.

Figure 6B:
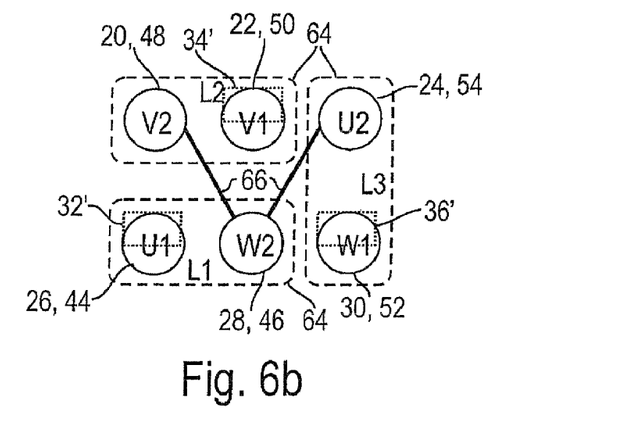
FIG. 6b shows a schematized representation for realizing the connection shown in FIG. 6a using the connecting device according to FIGS. 1 to 3.

FIG. 6b correspondingly shows the configuration of the connecting contacts on the motor connection unit 14, the coupling module 16' and the mains connection unit 18. The coupling module 16 has been replaced with a coupling module 16' for a star connection, which externally corresponds to the coupling module 16. The coupling module 16' contains wiring elements 66 which connect the winding connecting contacts to each other, which are not connected to phase connecting contacts 32, 34, 36.

The arrangement of the winding ends U1, U2, V1, V2, W1 and W2 on the motor connection unit 14, and of the phase lines on the mains connection unit 18 remains unchanged with respect to FIGS. 4b and 5b. In the fitting position illustrated in FIG. 6b, a rectangularly represented phase connecting contact 32' of the coupling module 16' contacts the phase contact 44 of the mains connection unit 18 and thus the phase line L1 and the winding beginning U1 via the motor connection unit, a phase connecting contact 34' of the coupling module 16' contacts the phase contact 50 of the mains connection unit 18 and thus the phase line L2 and the winding beginning V1, and a phase connecting contact 36' of the coupling module 16' contacts the phase contact 52 of the mains connection unit 18 and thus the phase line L3 and the winding beginning W1. The winding ends V2, W2 and U2 are not connected to a phase line, they are however connected to each other via wiring elements 66. The electrical connection represented in FIG. 6a is therefore obtained.

Figure 7A:
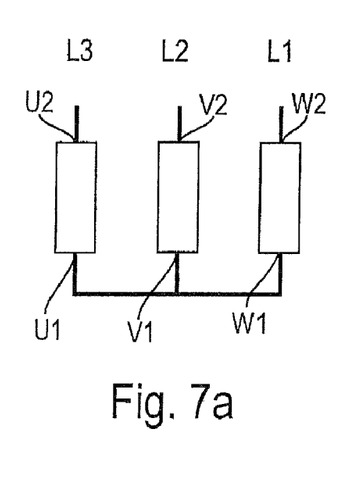
FIG. 7a shows an electrical circuit diagram for connecting the motor windings to the phase lines for a second direction of rotation in a star connection.

FIG. 7a shows the electrical circuit diagram for connecting the motor windings U, V and W for a star connection with a reversed direction of rotation with respect to the connection of FIG. 6a. The winding beginnings U1, V1 and W1 are electrically connected to each other, whereas the winding end U2 is connected to the phase line L3, the winding end V2 to the phase line L2, and the winding end W2 to the phase line L1.

Figure 7B:
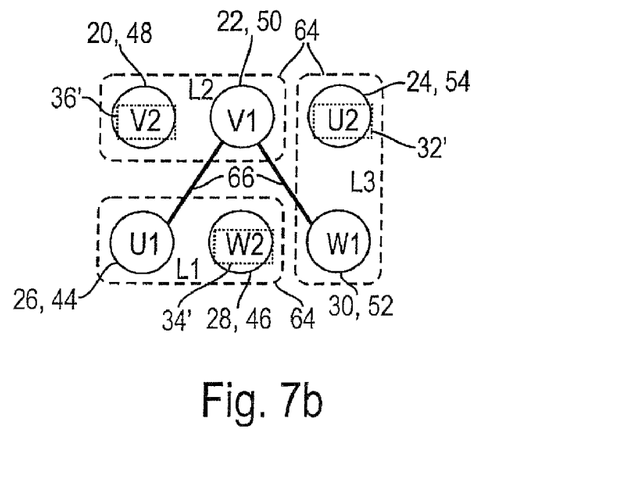
FIG. 7b shows a schematized representation for realizing the connection shown in FIG. 7a using the connecting device according to FIGS. 1 to 3.

FIG. 7b shows the contact with the coupling module 16' which has been rotated through 180° along an axis in the coupling direction. Therefore, the wiring elements 66 now electrically connect the winding beginnings U1, V1 and W1 to each other. In the fitting position illustrated in FIG. 7b, the rectangularly represented phase connecting contact 32' of the coupling module 16' contacts the phase contact 54 of the mains connection unit 18 and thus the phase line L3 and the winding end U2 via the motor connection unit, the phase connecting contact 34' of the coupling module 16' contacts the phase contact 46 of the mains connection unit 18 and thus the phase line L1 and the winding end W2, and the phase connecting contact 36' of the coupling module 16' contacts the phase contact 48 of the mains connection unit 18 and thus the phase line L2 and the winding end V2.

In the present case, the orientation of the coupling module can also be fixed by means of a coding piece 56.

It is therefore possible in a simple manner to realize a connection of the three-phase motor to a three-phase network without having to re-plug the connecting lines. The distinction between the delta connection and the star connection is realized by the selection of the appropriate coupling module 16, 16', and the reversal of the direction of rotation is realized by the fitting position of the coupling module. To rotate the coupling module, the motor connection lines and the mains connection lines need not be detached, and it is merely necessary to extend the connecting device and to rotate the coupling module, after which the connecting device can be reassembled. The entire connecting device can be realized within the cable in the form of a plug-in connection, so that a change of the connection and/or of the direction of rotation in situ is possible without using a tool.

Second Example Embodiment

Figure 8:
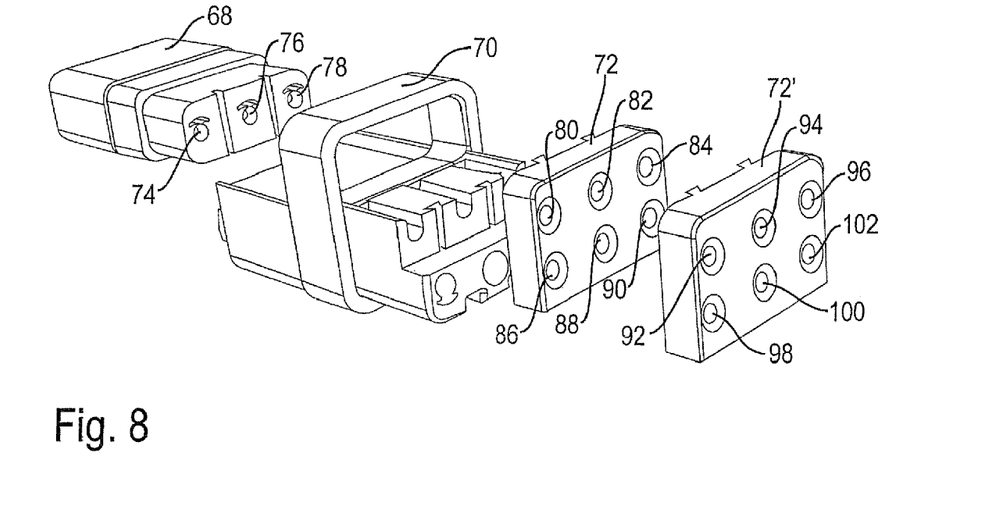
FIG. 8 shows a schematized three-dimensional representation of a second example embodiment having two exchangeable bridge modules and without the motor connection unit.

FIG. 8 shows in a schematized three-dimensional representation a second embodiment of the connecting device according to the invention having a mains connection unit 68, a coupling module 70 and two bridge modules 72, 72' and a motor connection unit (not shown).

On a side facing the coupling module, the mains connection unit 68 has three phase contacts 74, 76 and 78. Within the mains connection unit 68, the phase contacts 74, 76 and 78 are electrically connected to three terminals (not shown) on the side facing away from the coupling module, to which the three phase lines L1, L2 and L3 of a three-phase network can be coupled. The terminal of the phase lines L1, L2 and L3 can preferably be realized via clamping spring connections. The mains connection unit can be fitted into the coupling module 70 in two fitting positions rotated through 180° with respect to each other in the direction of insertion.

The coupling module 70 has an exchangeable bridge module, FIG. 8 showing a first bridge module 72 and a second bridge module 72' which can be used alternatively. Externally, the two bridge modules have the same structure. They differ from each other in wiring elements that are not illustrated such that a delta connection is obtained by means of the bridge module 72, whereas by means of the second bridge module 72', due to the wiring elements contained therein, the three motor windings can be connected to each other and to the phase lines so as to obtain a star connection.

On their side facing the coupling module 70, the bridge modules 72, 72' each have three phase connecting contacts via which they directly electrically contact the three phase contacts 74, 76 and 78 of the mains connection unit 68. On the side facing away from the coupling module 70, the bridge modules 72, 72' each have 6 winding connecting contacts 80 to 90 or 92 to 102, respectively, which are suitable for electrically contacting winding contacts on the motor connection unit that is not illustrated. The winding connecting contacts 80, 82 and 84, or 92, 94 and 96, respectively, which are arranged on the top in FIG. 8, are each electrically connected to the phase connecting contacts opposite thereto, whereas the winding connecting contacts 86, 88 and 90 or 98, 100 and 102, respectively, which are arranged at the bottom, are connected to the winding connecting contacts on the top in different manners depending on the bridge module. In practice, the terminals 92, 94 and 96 can however be dispensed with.

In the case of the bridge module 72, for example, the winding beginning U1 can be connected to the winding connecting contact 80, the winding beginning V1 can be connected to the winding connecting contact 82, and the winding beginning VV1 can be connected to the winding connecting contact 84 via the motor connection unit, whereas the winding connecting contact 86 contacts the winding end W2, the winding connecting contact 88 contacts the winding end U2, and the winding connecting contact 90 contacts the winding end V2 via the motor connection unit.

For a delta connection, the bridge module 72 then has a plurality of wiring elements which connect the winding connecting contacts 80 and 86, the winding connecting contacts 82 and 88, and the winding connecting contacts 84 and 90, respectively, to each other to thus obtain a contact U1-W2, V1-U2 and W1-V2.

Correspondingly, for a star connection, the bridge module 72' has the winding connecting contacts 92, 94 and 96 in an upper row, which as in the bridge module 72 are associated with the winding beginnings U1, V1 and W1, and the winding connecting contacts 98, 100 and 102 in a lower row which are correspondingly associated with the terminals W2, U2 and V2. The bridge module 72' contains wiring elements which connect the lower three winding connecting contacts 98, 100 and 102, i.e. W2-U2-V2 to each other so that a star connection is obtained.

The connection of the motor winding ends on the motor connection unit thus always remains the same, a crimp connection being preferably provided for the connection. In this embodiment, it is also possible to switch between the delta connection and the star connection in a simple manner by exchanging the bridge module without a re-plugging of the terminals being necessary.

For a change of the direction of rotation of the motor irrespective of the bridge module used, it is provided in the second embodiment that the mains connection unit 68 can be fitted in two positions rotated through 180° with respect to each other such that the reversal of the direction of rotation of the connected three-phase motor is thereby obtained. By way of example, the phase contact 74 is connected to the phase line L1 via the mains connection unit 68, the phase contact 76 is connected to the phase line L2, and the phase contact 78 is connected to the phase line L3. In the fitted position shown in FIG. 8, using the bridge module 72, the phase line L1 is then connected to the winding connecting contact 80 and thus to the winding beginning U1, the phase line L2 is connected to the winding connecting contact 82 and thus to the winding beginning V1, and the phase line L3 is connected to the winding connecting contact 84 and thus to the winding beginning W1. Upon rotation of the mains connection unit through 180°, the phase line L1 contacts the winding beginning W1, and the phase line L3 contacts the winding beginning U1, that means that the direction of rotation of the motor is reversed.

The same applies to the use of the bridge module 72'.

Figure 9:
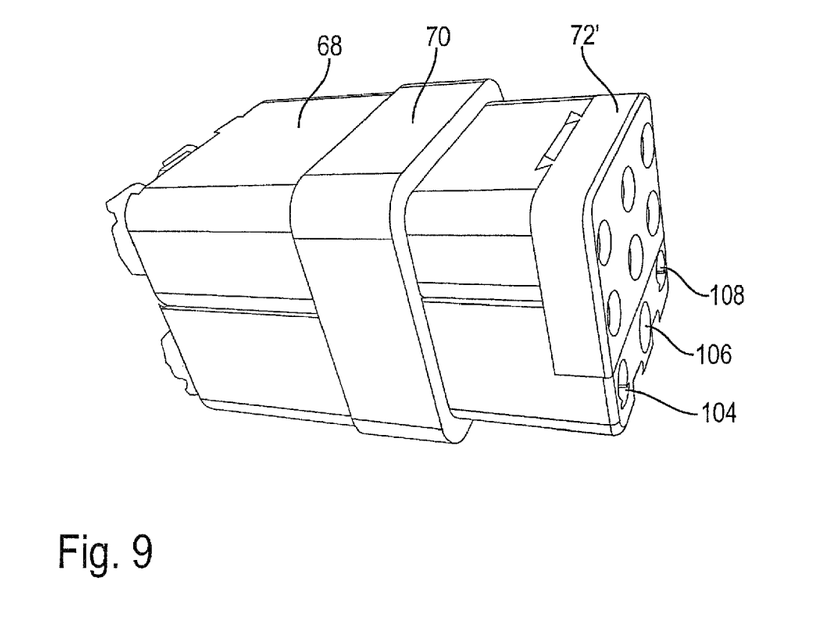
FIG. 9 shows the connecting device of FIG. 8 in a mounted state without the motor connection unit.

FIG. 9 shows the connecting device according to FIG. 8 in the assembled state with a mounted bridge module 72'. The second embodiment also provides more than the six winding terminals on the motor side, the protective earth, the neutral conductor and a further ground line of the three-phase network being for example adapted to be connected to the motor via the terminals 104, 106 and 108. These lines are not relevant to the present invention and are thus not discussed in more detail.

Figure 10:
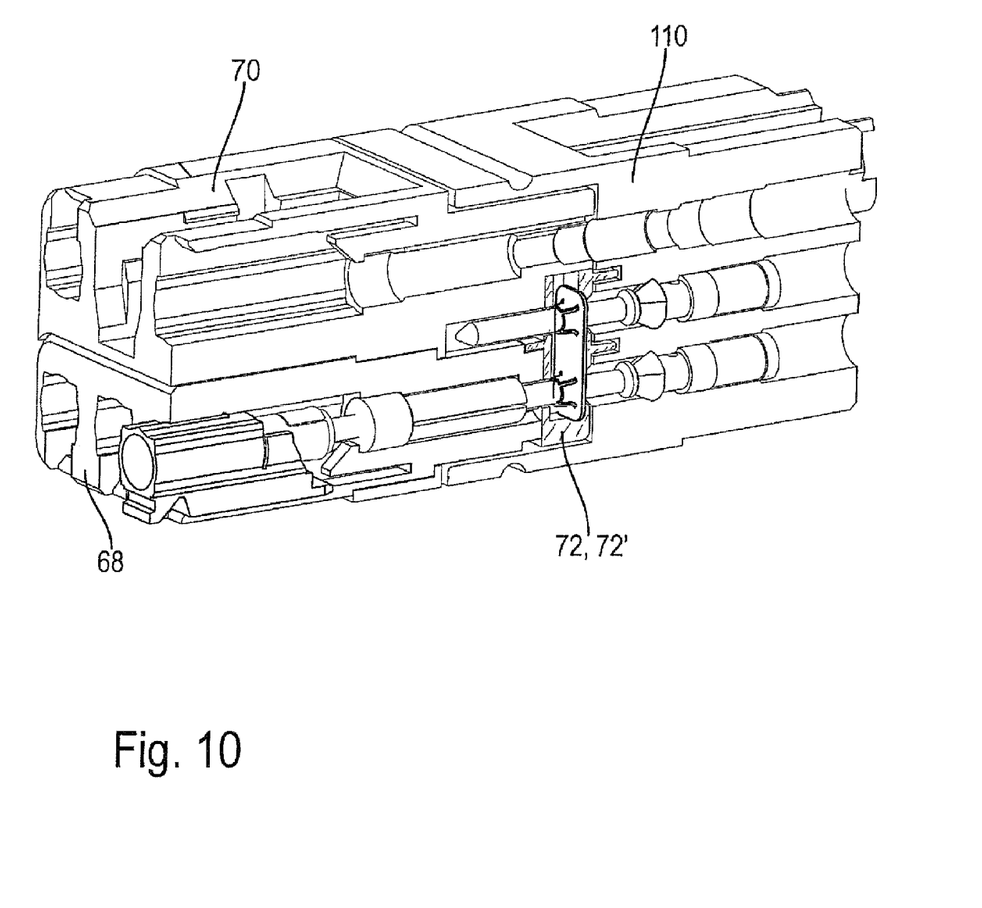
FIG. 10 shows a schematized section through the connecting device according to FIG. 9 with the motor connection unit mounted.

FIG. 10 schematically shows in a three-dimensional representation a connecting device as represented in FIGS. 8 and 9, which is partially cut open and has a separated motor connection unit 110. FIG. 10 shows the coupling module 70 with a mains connection unit 68 inserted and a bridge module 72 or 72'. The motor connection unit 110 is connected to the coupling module and encloses the bridge module 72, 72'. On the right-hand side of FIG. 10, the motor connection lines can thus be firmly connected to the mains connection unit, whereas on the left-hand side, the phase line of the three-phase network can be firmly connected to the mains connection unit 68.

A person skilled in the art knows different ways of connecting mains cables and motor connection lines via plug-in connections. In both embodiments, the phase lines are preferably connected to the mains connection unit via clamp spring connections.

For connecting the motor lines to the motor connection unit, a crimp connection is preferred.

Both embodiments also have in common to present a substantially parallelepipedal structure. The invention is however not restricted to an external parallelepipedal shape, a cylindrical shape is for example also conceivable. In the first embodiment, it is in particular only decisive for the connecting structure of the winding ends that the terminals are arranged in two groups of three terminals each, the terminals being point symmetric to each other such that the rotation of the coupling module through 180° leads to the desired reversal of the direction of rotation of the motor.

The invention claimed is:

1. A connecting device for electrically connecting a three-phase motor having at least three windings to a three-phase network, the connecting device being substantially parallelepiped, comprising a mains connection unit for connecting the phase lines of the three-phase network, a motor connection unit for connecting the six winding ends of the three-phase motor, an exchangeable coupling module, wherein the coupling module is arranged between the mains connection unit and the motor connection unit and contains contacts and wiring elements electrically connecting the six winding ends in a predefined manner to the three phase lines of the three-phase network, a first coupling module being provided which couples the three windings in a delta connection, and a second coupling module being provided which couples the three windings in a star connection, and one of the first and second coupling modules or each of the first and second coupling modules being adapted to be mounted so as to be rotated through 180° along a coupling direction to thus reverse the direction of rotation of the three-phase motor.

2. A connecting device for electrically connecting a three-phase motor having at least three windings to a three-phase network, the connecting device being substantially parallelepiped, comprising a mains connection unit for connecting the phase lines of the three-phase network, a motor connection unit for connecting the six winding ends of the three-phase motor, an exchangeable coupling module, wherein the coupling module is arranged between the mains connection unit and the motor connection unit and contains contacts and wiring elements electrically connecting the six winding ends in a predefined manner to the three phase lines of the three-phase network, the coupling module comprising an exchangeable bridge module which contains the wiring elements, a first bridge module being provided which contains wiring elements such that the three windings are connected in a delta connection, and a second bridge module being provided which contains wiring elements such that the three windings are connected in a star connection, and the mains connection unit being adapted to be mounted to the coupling module in two positions rotated through 180° with respect to each other to thus reverse the direction of rotation of the three-phase motor.

3. The connecting device according to claim 1, wherein the mains connection unit has one terminal for each of the three phase lines, the terminal branching in two parallel phase contacts in the direction to the coupling module, and the coupling module or each of the first and second coupling modules each electrically contacting only one of the parallel phase contacts.

4. The connecting device according to claim 1, wherein
on the side facing the coupling module, the motor connection unit has winding contacts to the six winding ends, which are arranged in two groups of three winding contacts each which are point symmetric to each other, wherein in the first group, the winding beginning of a first winding, the winding end of a third winding, and the winding beginning of the third winding are arranged side by side, and in the second group, the winding end of the first winding is point symmetric to the winding beginning of the first winding, the winding beginning of the second winding is point symmetric to the winding end of the third winding, and the winding end of the second winding is point symmetric to the winding beginning of the third winding.

5. The connecting device according to claim 1, wherein the connecting device is configured such that the phase lines of the three-phase network are adapted to be firmly coupled to the mains connection unit.

6. The connecting device according to claim 5, wherein the phase line of the three-phase network are coupled to the mains connection unit by clamping spring connections.

7. The connecting device according to claim 1, wherein the connecting device is configured such that the six winding ends are adapted to be firmly coupled to the motor connection unit.

8. The connecting device according to claim 7, wherein the six winding ends are coupled to the motor connection unit by a crimp connection.

9. The connecting device according to claim 2, wherein
on the side facing the coupling module, the motor connection unit has winding contacts to the six winding ends, which are arranged in two groups of three winding contacts each which are point symmetric to each other, wherein in the first group, the winding beginning of a first winding, the winding end of a third winding, and the winding beginning of the third winding are arranged side by side, and in the second group, the winding end of the first winding is point symmetric to the winding beginning of the first winding, the winding beginning of the second winding is point symmetric to the winding end of the third winding, and the winding end of the second winding is point symmetric to the winding beginning of the third winding.

10. The connecting device according to claim 2, wherein the connecting device is configured such that the phase lines of the three-phase network are adapted to be firmly coupled to the mains connection unit.

11. The connecting device according to claim 10, wherein the phase lines of the three-phase network are coupled to the mains connection unit by clamping spring connections.

12. The connecting device according to claim 2, wherein the connecting device is configured such that the six winding ends are adapted to be firmly coupled to the motor connection unit.

13. The connecting device according to claim 12, wherein the six winding ends are coupled to the motor connection unit by a crimp connection.

* * * * *